Figure 1:
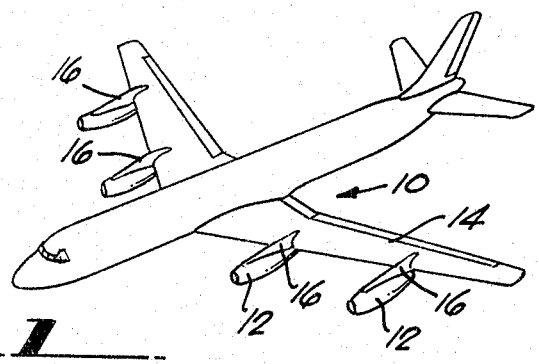

June 27, 1967  G. E. BOCKRATH  3,327,965
FLEXIBLE ENGINE PYLON
Filed Sept. 27, 1965

INVENTOR.
GEORGE E. BOCKRATH
BY Robert O. Richardson
— ATTORNEY.

United States Patent Office 3,327,965
Patented June 27, 1967

3,327,965
FLEXIBLE ENGINE PYLON
George E. Bockrath, Long Beach, Calif., assignor to Douglas Aircraft, Inc., Santa Monica, Calif.
Filed Sept. 27, 1965, Ser. No. 490,399
6 Claims. (Cl. 244—54)

The present invention relates to flexible engine pylons and more particularly to a pylon interconnecting an engine to the wing of an airplane.

Among the jet-powered commercial transport aircraft there is an airplane configuration in which the jet engines are suspended below and forwardly of the airplane wing. For reasons not germane to this invention, this particular design has proven to be quite popular with commercial airlines and a great number of such aircraft are now in use. One such design was recently modified from its original form to handle a larger cargo for transportation over a longer range. This was done with a minimum modification in design in elongating the fuselage and making the wings more rigid. However, it was found that this stiffened condition of the wing could produce an undesirable flutter under certain flight condition. As the wing twists and bends, the engine mass must follow if the pylon structure which interconnects the engine and the wing is the rigid connection. This induces metal fatigue and, carried to extreme, if the engine mass resonates at a vibration frequency of the wing, a destruction of the wing could result.

The principle of this invention, then, resides in the decoupling of the movement of the wing from the engine mass, so that when a wing twists and bends the engine mass will not follow the wing motion. Thus, if there is a tendency of the wing to be flutter-critical under certain flight conditions with the engine connected to it through a relatively stiff pylon structure, the tendency toward flutter will be effectively eliminated for the same flight conditions by attachment of the engine to the wing by a flexible pylon structure. This is done by permitting a pitching motion of the engine around in axis which is perpendicular, or approximately perpendicular, to the plane of symmetry of the aircraft. In addition, a dampening device is used so that the frequency of vibration of the wing is not transmitted to the engine mass. This dampening device dissipates the oscillatory energy which might cause undesirable motion of the engine mass.

In accordance with the present invention, the pylon support structure may be retained forward of the wing structure with the engines suspended forwardly and downwardly from the wing but the pylon structure is connected to the wing in such a manner that the desired flexibility can be obtained. The flutter problem can thus be avoided, in one embodiment of the invention, by hanging the pylon support structure to the wing by a hinge at the upper front side of the front spar of the wing, and connecting the lower rear portion of the pylon to the wing by an extensible strut. This second connection or extensible strut, may have either a linear or non-linear deflection load curve. The present invention, therefore, finds principal use as a means for controlling the motion of the engine mass on any aircraft having powerplants mounted on pylons joined to the wings.

It is, therefore, an object of the present invention to provide for a flexible pylon structure in which wing motion is isolated from the engine housing.

Another object is the provision of a flexible engine pylon that will permit pitching motion of an aircraft wing without causing pitching motion of the engine mounted thereto at the same pitching frequency.

Another object is the provision of a flexible engine pylon for dampening the vibration of a wing structure transmitted therethrough to a powerplant suspended therefrom.

Figure 2:
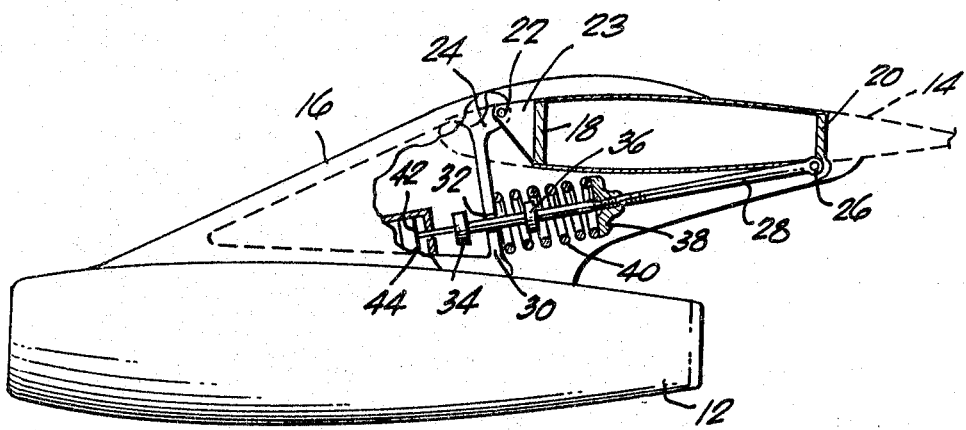
Figure 3:
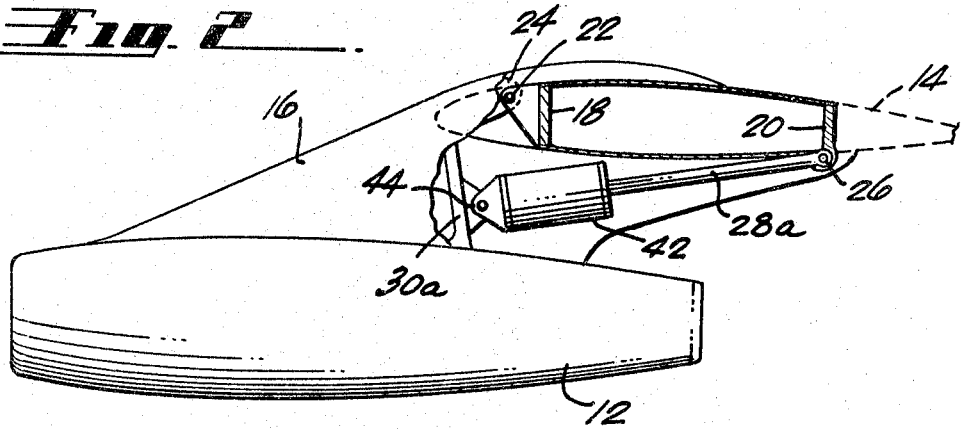

These and other objects will become more apparent as a description of the invention proceeds, having reference to the drawings wherein:

FIGURE 1 is a perspective view of a typical aircraft utilizing the present invention, FIG. 2 is a side view with parts broken away to better illustrate one embodiment of the present invention, and FIG. 3 is a side view of an alternate embodiment with parts broken away to better illustrate this form of the present invention.

Referring now to FIGURE 1, there is shown a typical commercial transport aircraft 10 having a pair of powerplants 12 mounted to each wing 14. These powerplants, typically jet engines, extend forwardly and downwardly from the wing 14 and are connected thereto by means of pylons 16. These pylons must be light, strong, and have a streamlined appearance in order to cause a minimum interruption of the air flow about the wing 14.

As can be seen in FIGURE 2, wing 14, the sectional outline of which is shown in dashed line, includes a front spar 18 and a rear spar 20, which extend along the wing and forms the main supporting structure for the wing section. Hingedly mounted by hinge 22 to bracket 23 on the front spar 18 is the support frame 24 of pylon 16. While this frame is shown as a triangular mounting to which the engine housing or nacelle 12 is fastened, it is to be understood that the pylon structure may be of many configurations, depending upon the design of selected aircraft upon which it is mounted. Pylons generally are multiple spar and bulkhead structures of high strength aluminum alloy and titanium. These pylon structures suspend and support the nacelle structures 12 that house the demountable powerplant sections. The pylons are raked, with the leading edges zero degrees and five minutes inboard with respect to the fuselage center line. They are cantilevered forward and downward from the wing to which they are joined.

Hingedly mounted at the lower end of rear spar 20 by means of pivot pin 26, is a nacelle attitude positioning rod or extensible strut 28 which is yieldably connected to a lower portion of stay 30 on the pylon support frame 24. This stay 30 has an aperture 32 therein through which the extensible strut 28 passes. Suitable stops 34, 36 limit the relative movement of strut 28 through the opening 32 and thus limit the degree of tilt of wing 14 relative to the engine nacelle 12. Collar 38 is threadably mounted on rod 28 and may be adjusted therealong. Between the collar 38 and stay 30 is a compression spring 40 which yieldably urges the pylon structure at its lower portion forwardly. The adjustment of collar 38 determines the attitude of the nacelle 12 relative to the wing structure and path of travel of the airplane. Attached to the end of strut 28 is a piston 42 which is housed within a dashpot structure 44 mounted on the pylon. The dashpot additionally serves as a dampening device to retard any pivotal movement of the pylon structure about hinge 22. It can thus be seen that flutter vibrations of the wing are dissipated through the flexible coupling of the engine pylon to the wing and does not materially affect movement of the mass of the nacelle and engine to which it interconnects with the wing structure.

Reference is now made to FIGURE 3 wherein there is shown an alternative embodiment. Like parts are identified by like numerals. Here the wing structure 14, front spar 18, rear spar 20, nacelle 12, and pylon 16 is the same as in FIG. 1. However, in FIG. 2, the lower rear portion, stay 30A, does not have an aperture therein for the purpose of permitting relative movement with the nacelle attitude positioning strut 28A. Instead, a pneumatic spring cylinder 42 is pivotally mounted at 44 to the lower portion of pylon strut 30A. The inner end of strut 28A fits into the cylinder 42 and is adjustably maintained in a relatively immobile position by pneumatic spring actuation. Strut 28A is fastened to the rear lower portion of the main spar 20 as shown at pivot point 26.

While a preferred embodiment of this invention has been described, it is to be understood that there are many types of pylon structures and wing structures that may utilize the principles of this invention. Accordingly, the scope of the present invention is not to be limited to the particular pylon structure and wing structure shown, it being understood that the intended scope of this invention may be found in a reasonable interpretation of the appended claims.

What is claimed is:

1. In combination with an airplane wing structure and a powerplant to be mounted thereon, the improvement of:
   a pylon for interconnecting said powerplant and said wing structure,
   said pylon being connected to said powerplant and pivotally mounted to said wing structure,
   said pylon having an extensible support pivotally connected to said wing structure and yieldably interconnected to said pylon to dampen the transmission of wing motion to said powerplant.

2. In combination with an airplane wing structure and a powerplant to be mounted thereon, the improvement of:
   a pylon for interconnecting said powerplant and said wing structure,
   said pylon being connected to said powerplant and pivotally mounted to said wing structure,
   said pylon having an extensible strut extending diagonally upwardly and rearwardly,
   the upper and rearward end of said strut being pivotally connected to said wing structure, and
   yieldable means interconnecting said strut with said pylon to dampen the transmission of wing motion to said powerplant.

3. In combination with an airplane wing structure and a powerplant to be mounted thereon, the improvement of:
   a pylon for interconnecting said powerplant and said wing structure,
   said pylon being connected to said powerplant and pivotally mounted to said wing structure,
   said pylon having an extensible support pivotally connected to said wing structure, and
   yieldable means interconnecting said support with said pylon to dampen the transmission of wing motion to said powerplant,
   said yieldable means including spring means,
   said pylon having a stay with an aperture therein,
   one end of said support being extensibly engageable with said stay through said aperture,
   said spring means interconnecting said stay and said support in predetermined relative position.

4. In combination with an airplane wing structure and a powerplant to be mounted thereon, the improvement of:
   a pylon for interconnecting said powerplant and said wing structure,
   said pylon being connected to said powerplant, and pivotally mounted to said wing structure,
   said pylon having an extensible support pivotally connected to said wing structure, and
   yieldable means interconnecting said support with said pylon to dampen the transmission of wing motion to said powerplant,
   said yieldable means including spring means,
   said pylon having a stay with an aperture therein,
   one end of said support passing through said aperture,
   stop means on said support on both sides of said stay and spaced therefrom to limit longitudinal movement of said support passing therethrough,
   said spring means interconnecting said stay and said support in predetermined relative position.

5. In combination with an airplane wing structure and a powerplant to be mounted thereon, the improvement of:
   a pylon for interconnecting said powerplant and said wing structure,
   said pylon being connected to said powerplant and pivotally mounted to said wing structure,
   said pylon having an extensible support pivotally connected to said wing structure, and
   yieldable means interconnecting said support with said pylon to dampen the transmission of wing motion to said powerplant,
   said yieldable means including a pneumatic spring cylinder mounted on said pylon and engageable with said support.

6. In combination with an airplant wing structure and a powerplant to be mounted thereon, the improvement of:
   a pylon for interconnecting said powerplant and said wing structure,
   said pylon being pivotally connected to said powerplant and mounted to said wing structure,
   said pylon having an extensible support pivotally connected to said wing structure, and
   yieldable means interconnecting said support with said pylon to dampen the transmission of wing motion to said powerplant,
   said yieldable means including a dashpot on said pylon into which said support terminates.

References Cited

UNITED STATES PATENTS

| | | | |
|---|---|---|---|
| 1,773,481 | 8/1930 | Fokker | 244—54 |
| 3,168,270 | 2/1965 | Bligard et al. | 244—54 X |
| 3,201,069 | 8/1965 | Haskin | 244—54 |
| 3,222,017 | 12/1965 | BoBo | 244—54 |

MILTON BUCHLER, *Primary Examiner.*

B. BELKIN, *Assistant Examiner.*